United States Patent
Agetsuma

(10) Patent No.: US 9,940,042 B2
(45) Date of Patent: Apr. 10, 2018

(54) DISTRIBUTED STORAGE SYSTEM, AND DATA-ACCESS METHOD THEREFOR

(71) Applicant: HITACHI, LTD., Tokyo (JP)

(72) Inventor: Masakuni Agetsuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 281 days.

(21) Appl. No.: 14/900,791

(22) PCT Filed: Sep. 6, 2013

(86) PCT No.: PCT/JP2013/074157
§ 371 (c)(1),
(2) Date: Dec. 22, 2015

(87) PCT Pub. No.: WO2015/033451
PCT Pub. Date: Mar. 12, 2015

(65) Prior Publication Data
US 2016/0139841 A1      May 19, 2016

(51) Int. Cl.
*G06F 3/06* (2006.01)
*G06F 11/14* (2006.01)
*G06F 11/20* (2006.01)

(52) U.S. Cl.
CPC ............ *G06F 3/0619* (2013.01); *G06F 3/06* (2013.01); *G06F 3/065* (2013.01); *G06F 3/067* (2013.01); *G06F 11/14* (2013.01); *G06F 11/2094* (2013.01)

(58) Field of Classification Search
CPC .......... G06F 17/30575; G06F 11/2076; G06F 11/14; G06F 11/2094; G06F 3/06;
(Continued)

(56) References Cited

U.S. PATENT DOCUMENTS

2002/0133512 A1* 9/2002 Milillo ................ G06F 11/2082
2004/0024808 A1 2/2004 Taguchi et al.
(Continued)

FOREIGN PATENT DOCUMENTS

JP    2004-171278 A    6/2004

OTHER PUBLICATIONS

Shunsuke Shiina, Cloud Jidai no Data Store Cassandra kara Nozoku NoSQL no Sekai, Big Data o Seisu Cloud no Gijutsu, Hadoop & NoSQL, Apr. 25, 2011(Apr. 25, 2011), pp. 82 to 89.
(Continued)

*Primary Examiner* — Tuan Thai
*Assistant Examiner* — Edward Waddy, Jr.
(74) *Attorney, Agent, or Firm* — Volpe and Koenig, P.C.

(57) ABSTRACT

Each of a plurality of storage systems in a distributed storage system is provided with: a strong-consistency-control processor which controls data synchronization that ensures consistency of duplicated data; a weak-consistency-control processor which controls data synchronization that does not necessarily ensure consistency of the duplicated data; an access-switching processor which determines a redundancy number corresponding to the number of storage systems having duplicated data stored thereon, selects in accordance with the characteristics of the duplicated data and the position of a terminal issuing the I/O request, storage systems of a number corresponding to the redundancy number, and selectively determines, as the control for the data synchronization, one from among the strong-consistency-control processor, the weak-consistency-control processor, and consistency control unnecessary; and an I/O processor which executes, on the basis of the determined control for the data synchronization, the I/O request for the duplicated data in the selected storage systems.

14 Claims, 14 Drawing Sheets

(58) Field of Classification Search
CPC ........ G06F 3/0619; G06F 3/065; G06F 3/067; G06F 17/30194; G06F 17/30212; G06F 17/30215; G06F 17/30371; G06F 17/30581
USPC .......... 711/162, E12.066; 707/E17.032, 611, 707/624, 827, 999.201; 1/1
See application file for complete search history.

(56) References Cited

U.S. PATENT DOCUMENTS

| | | |
|---|---|---|
| 2005/0108298 A1 | 5/2005 | Iyengar et al. |
| 2005/0228812 A1 | 10/2005 | Hansmann et al. |
| 2012/0303576 A1* | 11/2012 | Calder ................ G06F 11/2076 707/611 |

OTHER PUBLICATIONS

Takashi Kobayashi, KVS 'Cassandra' no Jitsuryoku Node-su 3 Bai de Seino ga 2.3 Bai ni Data Copy no Kufu demo Kosokuka, Nikkei Systems, Jun. 26, 2011 (Jun. 26, 2011), No. 219, pp. 52 to 55.

* cited by examiner

FIG. 8

| STORAGE NAME | IP ADDRESS | POSITION INFORMATION | CREDIBILITY |
|---|---|---|---|
| ST1 | 192.168.10.1 | A | HIGH |
| ST2 | 192.168.20.1 | A | HIGH |
| ST3 | 192.168.30.1 | A | MIDDLE |
| ST4 | 192.168.40.1 | B | MIDDLE |
| ST5 | 192.168.50.1 | C | LOW |

FIG. 9

| TEMPLATE NAME | CONSISTENCY | RESPONSE | REDUNDANCY NUMBER |
|---|---|---|---|
| T1 | STRONG | VALUED | 2 |
| T2 | STRONG | — | 2 |
| T3 | WEAK | VALUED | 3 |
| T4 | WEAK | — | 3 |
| T5 | UNNECESSARY | VALUED | 1< |
| T6 | UNNECESSARY | — | 1< |

FIG. 10

| PATH | IN-USE TEMPLATE NAME | CONDITION | | IN-USE STORAGE |
|---|---|---|---|---|
| | | COUNTRY | CREDIBILITY | |
| /A/profileDB/ | T2 | A | HIGH | ST1, ST2 |
| /A/DB/ | T1 | NONE | MIDDLE | ST3, ST4 |
| /A/frendList/ | T4 | NONE | LOW | ST1, ST4, ST5 |
| /A/message/ | T3 | NONE | LOW | ST1, ST2, ST3 |
| /A/movie/ | T6 | NONE | LOW | ST1, ST3, ST5 |
| /A/image/ | T5 | NONE | LOW | ST1, ST4, ST5 |

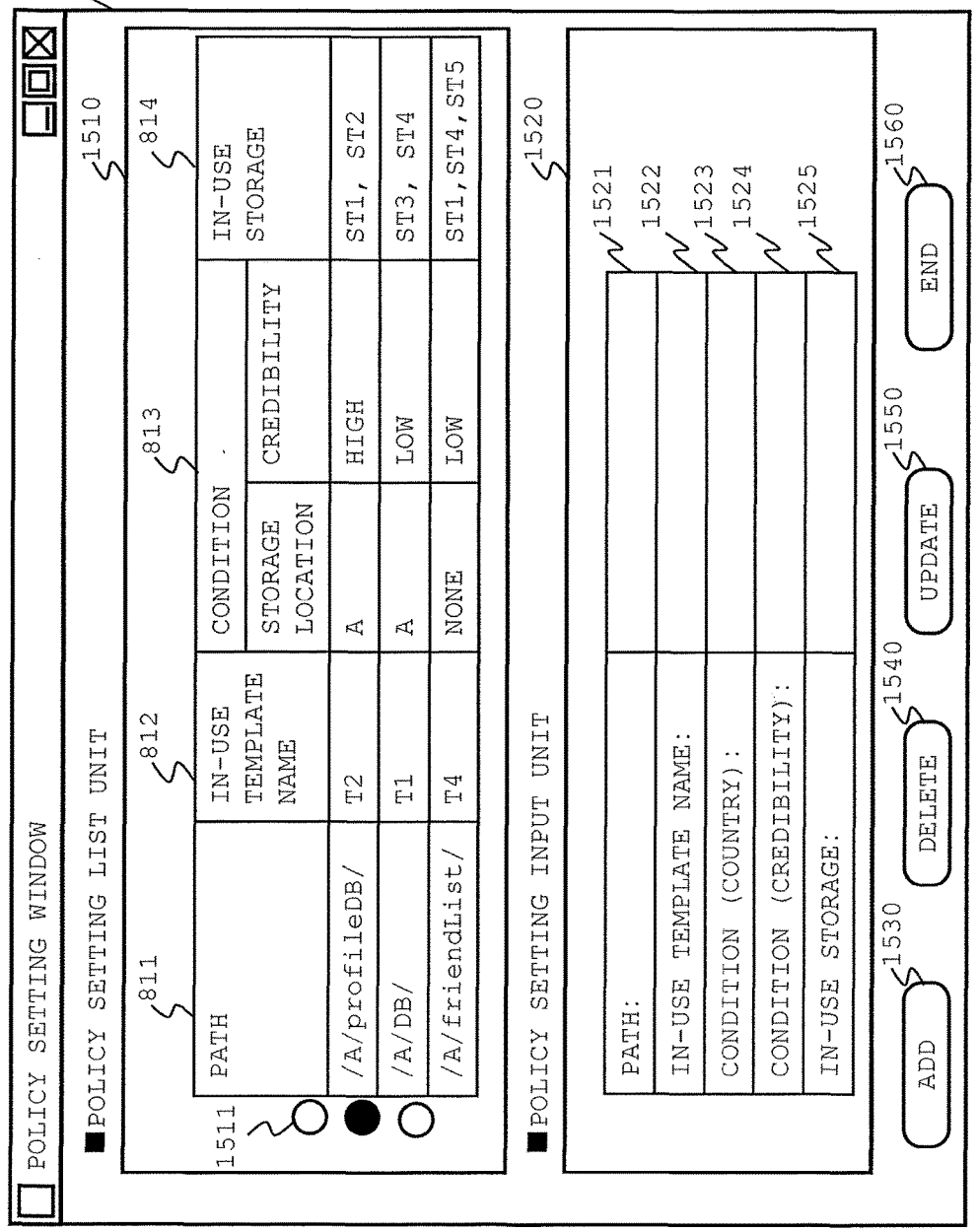

DISTRIBUTED STORAGE SYSTEM, AND DATA-ACCESS METHOD THEREFOR

TECHNICAL FIELD

The present invention relates to a distributed storage system and a data-access method therefor.

BACKGROUND ART

In a distributed storage system, data is duplicated and the duplicated data is stored in plural storage systems that are dispersively disposed in order to improve the performance of the distributed storage system by distributing I/O processing and to protect data against failures. In the distributed storage system, there is a problem in that how to deal with the duplicated data when the duplicated data has to be updated. If the synchronization among updated data is performed throughout the entirety of the distributed system, although the duplicated data can be updated with the consistency of the duplicated data being ensured, there arise different latencies for the synchronization among individual distributed storage systems, so that the write performance (at the update time) is sacrificed.

Therefore, Patent Literature 1 discloses a scheme for improving the I/O performance of the distributed storage system by switching a consistency control scheme in accordance with policies.

CITATION LIST

Patent Literature

Patent Literature 1: United States Unexamined Patent Application Publication No. 2005/0108298

SUMMARY OF INVENTION

Technical Problem

In the case where there is duplicated data in storage systems distributed over a wide range, if data duplication and consistency-control processing are performed without taking the dispositions of the data on the network or the geographic dispositions of the data into consideration, there arises a problem in that the access latency of the entirety of the distribution system becomes large.

Solution to Problem

The present invention will disclose a distributed storage system in which plural storage systems are coupled with one another via a network. Each included in the plural storage systems is provided with: a strong-consistency-control processing unit which, during access to duplicated data, which are duplicated and stored in the distributed storage system, controls data synchronization that ensures the consistency of the duplicated data; a weak-consistency-control processing unit which, during access to the duplicated data, controls data synchronization that does not necessarily ensure the consistency of the duplicated data; an access-switching processing unit which, in response to an I/O request for the duplicated data, determines, in accordance with policies predetermined in accordance with the characteristics of the duplicated data, a redundancy number corresponding to the number of storage systems to have the duplicated data stored thereon, selects, from among the plural storage systems, in accordance with the characteristics of the duplicated data and the position of a terminal issuing the I/O request, storage systems of a number corresponding to the redundancy number, and selectively determines, as the control for the data synchronization, one from among the strong-consistency-control processing unit, the weak-consistency-control processing unit, and consistency control unnecessary; and an I/O processing unit which executes, on the basis of the determined control for the data synchronization, the I/O request for the duplicated data in the selected storage systems.

Advantageous Effects of Invention

According to the present invention, when data is stored in storage systems distributed on the network or geographically, or when data stored in the storage systems distributed on the network or geographically is referred to, access latency can be prevented from becoming worse while consistency control processing is being performed.

BRIEF DESCRIPTION OF DRAWINGS

FIG. 8 is a diagram showing a configuration example of a storage management table.

FIG. 9 is a diagram showing a configuration example of a template management table.

FIG. 10 is a diagram showing a configuration example of a policy management table.

FIG. 15 is a diagram showing an example of a GUI (graphical user interface) which manages policy settings.

DESCRIPTION OF EMBODIMENTS

Hereinafter, an embodiment of the present invention will be explained with reference to the accompanying drawings. For the sake of clear explanation, omissions and simplifications will be made accordingly in the following descriptions and drawings. The present invention is not limited to this embodiment, and all application examples that coincide with the spirit of the present invention falls within the technical scope of the present invention. As for components used in this embodiment, it is all right that any component is used singularly or together with the same components unless otherwise specified.

In the following explanation, there is a case where each piece of information is explained not only in the form of "xxx Table", but also in the form of a data configuration other than a table. In order to show that each kind of information is independent from a data configuration, "xxx Table" is sometimes referred to as "xxx Information".

In the following explanation, a processing unit for realizing predefined functions is realized by making the processor (for example, the CPU (central processing unit)) of a computer execute programs for realizing the predefined functions appropriately using a memory device (for example, a memory) and a communication interface device (for example, a communication port).

A data synchronization scheme, in which the latest data can be referred to during access to a distributed storage system, is referred to as strong consistency control, and a data synchronization scheme, in which the latest data cannot necessarily be referred to and the latest data can become referred to after a while, is referred to as weak consistency control. In other words, data synchronization control that ensures the consistency of duplicated data stored in the distributed storage system is referred to as the strong consistency control, and data synchronization control that does not necessarily ensure the consistency of the duplicated data is referred to as the weak consistency control. An example of the strong consistency control and an example of the weak consistency control will be explained with reference to FIG. 1 and FIG. 2.

Figure 1:
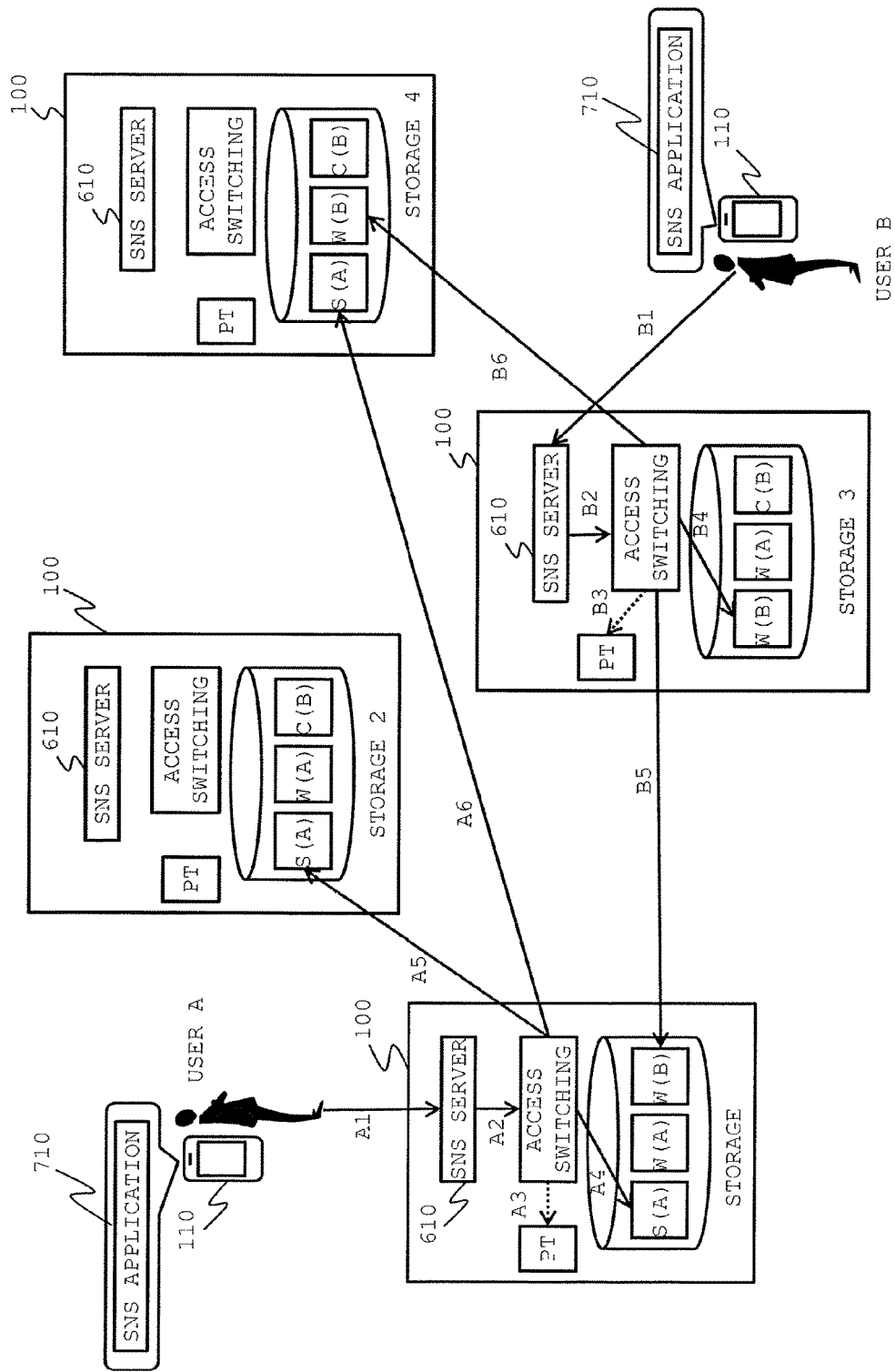
FIG. 1 is a schematic diagram showing the write processing of a distributed storage system.

FIG. 1 is a schematic diagram showing the write processing of a distributed storage system of this embodiment. In the distributed storage system, plural storage systems (a storage system is sometimes referred to as a storage for simplicity) are coupled with one another via a network. The behavior of the distributed storage system of this embodiment during the time when the write processing is performed will be explained with reference to FIG. 1. Here, in FIG. 1, solid lines denote the flows of data, and dashed lines denote the flows of pieces of control information.

Step A1 to Step A6 show a scene in which user A performs accounting processing using an SNS (social networking service) application 710 of a mobile terminal 110. In this case, because the update of accounting information requires accurate consistency control, the strong consistency control is selected.

User A accesses an application server (SNS server) 610 in Storage 1 using the SNS application 710 of the mobile terminal 110 (at Step A1). The SNS server 610 in Storage 1 transfers a write request for updating the accounting information to an access-switching processing unit (at Step A2).

The access-switching processing unit judges that the write request for accessing the accounting information is a write request that needs the strong consistency control by checking the write request against a policy management table (PT). In addition, it is prescribed in the policy management table that the accounting information should be duplicated and stored in three bases redundantly. Therefore, the access-switching processing unit selects Storage 1 which user A accessed, Storage 2 which is located near to user A, and Storage 4 which is located far apart from Storage 1 and Storage 2 as storages for the duplicated accounting information to be stored (at Step A3).

In this case, quorum (constant number) is used in the strong consistency control. Quorum is used for ensuring the consistency of processing in a distributed system, and is used in a method in which majority approval is required for the processing to be executed. With an assumption that C denotes the number of the duplicated data; R denotes the number of times of reading (the number of duplicated data read from the number C of the duplicated data); W denotes the number of times of writing (the number of duplicated data used for checking the completion of write operation when the duplicated data is written into the number C of the duplicated data) the consistency of the data is ensured if both R+W>C and W>C/2 are satisfied. R and W that satisfy these inequalities will be referred to as READ constant and WRITE constant respectively. FIG. 1 shows a case where C=3, R=2, and W=2, and each of Storage 1, Storage 2, and Storage 4 has the duplicated data. When the access-switching processing unit in Storage 1 performs a write operation on Storage 1, Storage 2, and Storage 4, the access-switching processing unit returns the completion of write operation to the SNS server 610 after receiving the completion of write operation from at least two storages, with the result that the consistency of the data writing is ensured (at Steps A4, A5, and A6).

Through the abovementioned processing, the completion of write operation regarding the write operation by user A (update of accounting information) can be expected to be returned from Storage 1 and Storage 2 that is likely to be located near to Storage 1, therefore a write operation with small access latency under the strong consistency control can be performed.

On the other hand, Step B1 to Step B6 show a scene in which user B writes a comment using an SNS application. Because the comment information written using the SNS application does not necessarily require accurate consistency, the weak consistency control, under which data synchronization can be eventually achieved, is selected.

User B accesses an SNS server 610 in Storage 3 using an SNS application 710 of a mobile terminal 110 (at Step B1). The SNS server 610 in Storage 3 transfers a write request to an access-switching processing unit (at Step B2).

The access-switching processing unit judges that, because the write request is a write request regarding comment information, the write request is a write request that needs the weak consistency control by checking the write request against a policy management table (PT). Furthermore, it is prescribed in the policy management table that the comment information should be duplicated and stored in three bases redundantly. Therefore, the access-switching processing unit in Storage 3 selects Storage 3 which user B accessed, Storage 4 which is located near to user B, and Storage 1 which is located far apart from Storage 3 and Storage 4 and would be helpful in a time of a major disaster as storages for storing the duplicated comment information (at Step B3).

Under the weak consistency control, duplicated data read by a user and an SNS server 610 does not have to be in synchronization with one another at a certain time point. Therefore, for example, the completion of write operation is returned to the SNS server 610 in Storage 3 when the write operation to Storage 3 is finished, and the write operations to Storage 1 and Storage 4 are asynchronously performed. In other words, during the time period from the time when the write operation to Storage 3 is finished to the time when the write operations to Storage 1 and Storage 4 are finished, there arises a state in which the duplicated data is not in synchronization with one another. A consistency control scheme that allows such a state as above to arise is the weak consistency control (at Steps B4, B5, and B6).

Through the abovementioned processing, by writing the comment information in Storage 3 that user B accesses, by returning the completion of write operation, and by not waiting for the completion of write operation from Storage 1 and Storage 4, a write operation with small access latency under the weak consistency control can be performed.

Especially in a circumstance in which both data that requires the strong consistency control such as SNS (accounting information and the like), which has already been explained in the above summary, and data that does not necessarily require accurate consistency (such as comment information) mixedly exist, data can be appropriately stored in a distributed manner.

Figure 2:
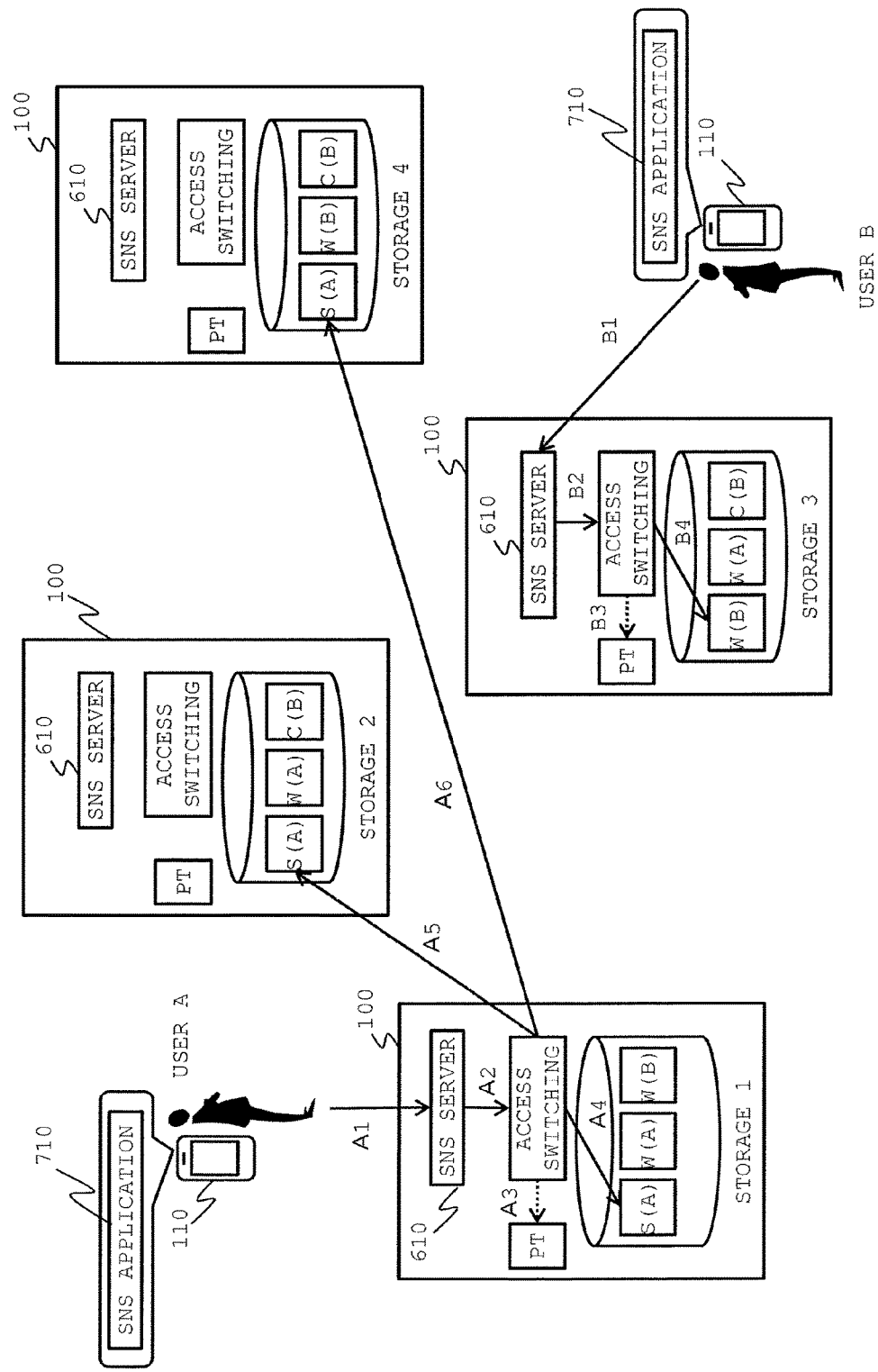
FIG. 2 is a schematic diagram showing the read processing of the distributed storage system.

FIG. 2 is a schematic diagram showing the read processing of the distributed storage system of this embodiment. The behavior of the distributed storage system of this embodiment during the time when the read processing is performed will be explained with reference to FIG. 2. Here, in FIG. 2, solid lines denote the flows of data, and dashed lines denote the flows of pieces of control information.

Step A1 to Step A6 show a scene in which user A refers to accounting information using the SNS application. Because the reading of the accounting information requires accurate consistency control, the strong consistency control is selected.

User A accesses the application server (SNS server) 610 in Storage 1 using the SNS application 710 of the mobile terminal 110 (at Step A1). The SNS server 610 transfers a read request for reading accounting information to the access-switching processing unit (at Step A2).

The access-switching processing unit judges that the read request for accessing the accounting information is a read request that needs the strong consistency control by checking the read request against the policy management table (PT). In addition, it can be understood from the policy management table that duplicated data is stored in Storage 1, Storage 2, and Storage 4 with the redundancy number 3 (at Step 3).

In this case, because quorum (constant number) is used in the strong consistency control, data is read out from each of Storage 1, Storage 2, and Storage 4, and after the acknowledgments of read operation completion are returned from at least two storages, the read-out data is returned to the SNS server 610. However, when the data read out from the storages is checked, if the number of data which coincide with one another is over READ constant, these data pieces are returned to the SNS server 610. For example, data read out first from two storages is checked and if they coincide with each other, the data is returned to the SNS server 610. If they do not coincide with each other, data read out thirdly is checked with each of the data read out first from the two storages, and data that coincides with the data read out thirdly is returned to the SNS server 610 (at Steps A4, A5, and A6).

Through the abovementioned processing, the acknowledgment of read operation completion regarding the read operation by user A can be expected to be returned from Storage 1 and Storage 2 that is likely to be located near to Storage 1, therefore a read operation with small access latency under the strong consistency control can be performed.

On the other hand, Step B1 to Step B4 show a scene in which user B reads comment information using an SNS application. Because the comment information written by the SNS application does not necessarily require accurate consistency, the weak consistency control is selected.

User B accesses the SNS server 610 in Storage 3 using the SNS application 710 of the mobile terminal 110 (at Step B1). The SNS server 610 transfers the read request to the access-switching processing unit (at Step B2).

The access-switching processing unit judges that the read request for accessing comment information is a read request that needs the weak consistency control by checking the read request against the policy management table (PT). Furthermore, it can be understood from the policy management table that the duplicated comment information are stored in Storage 3, Storage 4, and Storage 1 as duplicated data (at Step B3).

Because there is the duplicated data in local Storage 3, the access-switching processing unit accesses local Storage 3, obtains the comment information, and returns the information to the SNS server 610 (at Step B4).

Through the abovementioned processing, by reading the comment information from Storage 3 that user B accesses, and by returning the read-out data (comment information), a read operation with small access latency under the weak consistency control can be performed.

Figure 3:
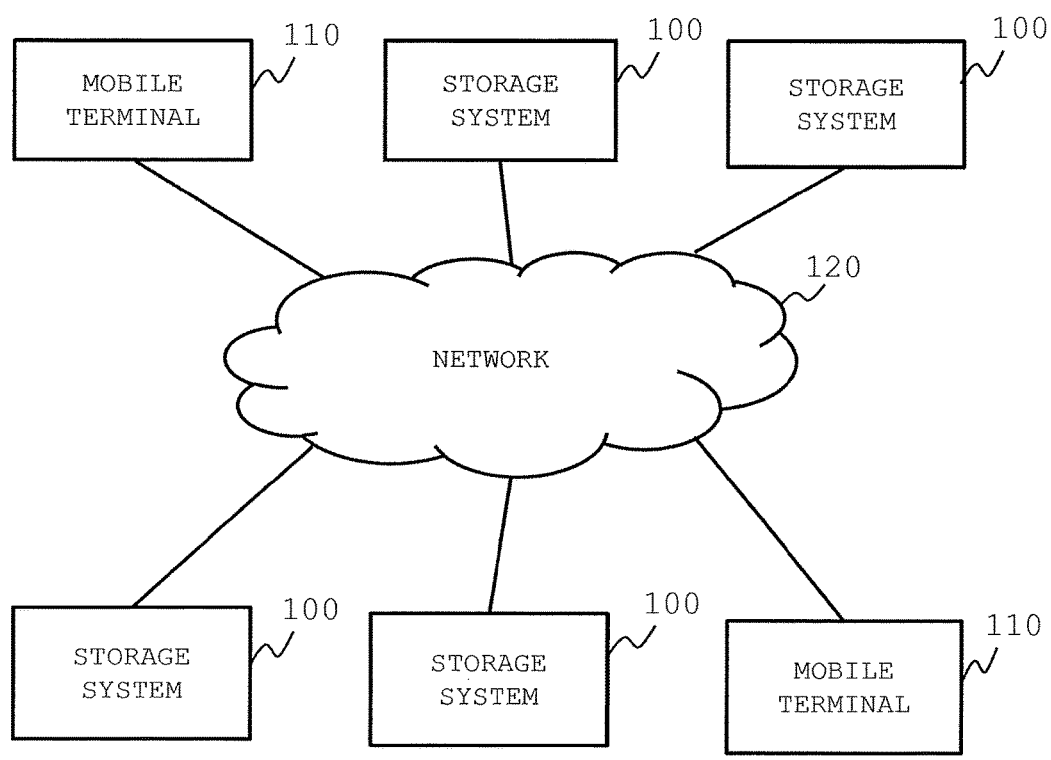
FIG. 3 is a block diagram showing a configuration example of the distributed storage system.

FIG. 3 is a block diagram showing a configuration example of the distributed storage system of this embodiment. The distributed storage system includes storage systems 100, a network 120, and mobile terminals 110.

A storage system 100 is coupled with mobile terminals 110 and other storage systems 100 via the network 120.

A storage system 100 is a storage system that is compatible with plural data communication protocols. For example, a storage system 100 establishes data communication with the mobile terminals 110, management computers, and the like using communication protocols such as NFS (network file system), CIFS (common internet file system), FTP (file transfer protocol), and HTTP (hyper text transfer protocol).

For example, a storage system 100 receives an I/O request for data communication service from a mobile terminal 110 via the network 120, and returns the processing result to the mobile terminal 110.

In addition, a storage system 100 duplicates data, which is stored in itself, for other storage systems 100 via the network 120 in order to improve the response and the fault tolerance. For example, the storage system 100 duplicates the data for other storage systems 100 in synchronization with a data write request to itself. Alternatively, the storage system 100 duplicates the data for other storage systems 100 in asynchronization with the data write request. When an I/O request (a read request or a write request) for the duplicated data is issued from a mobile terminal 110, the storage system 100 performs reference to or update for the data while performing necessary consistency control processing.

A storage system 100 can be materialized in the form of a device fixed in a facility such as a data center, or can be materialized in the form of a mobile device whose location can vary such as a container-typed device.

When a storage system 100 encounters a failure owing to a disaster such as a hardware failure, an electric power failure, a tidal wave, or a fire, the storage system 100 is switched to a storage system 100 including the duplicated data, and the communication service provided to the mobile terminal 110 is resumed. The failed storage system 100 is switched to a normal storage system, for example, at the time point designated by a manager. Alternatively, it is conceivable that storage systems 100 that are free from failures perform communication with one another, and they perform the switching processing on their own.

The network 120 can be any communication network such as the Internet; an LAN (local area network); a WAN (wide area network); a SAN (storage area network); a public wireless LAN; or a mobile-phone communication network.

Furthermore, the network 120 can be configured in the form of a combination of plural different communication networks.

A mobile terminal 110 can be any of a mobile phone including a smart phone, tablet-typed terminal, a laptop computer, and the like. In addition, it is conceivable that the distributed storage system includes plural different types of mobile terminal 110. Furthermore, a mobile terminal 110 can be a terminal of a geographically mobile type such as a terminal that is worn by a living thing, for example, a human being, or mounted on a mobile object, for example, an automobile.

In addition, although the storage systems 100 are used in this embodiment, systems that can be used in the present patent application are not limited to the storage systems 100. For example, general-purpose computers can be used. Furthermore, although the mobile terminals 110 are used in this embodiment, terminals that can be used in the present patent application are not limited to the mobile terminals 110. For example, general-purpose computers can be used.

Figure 4:
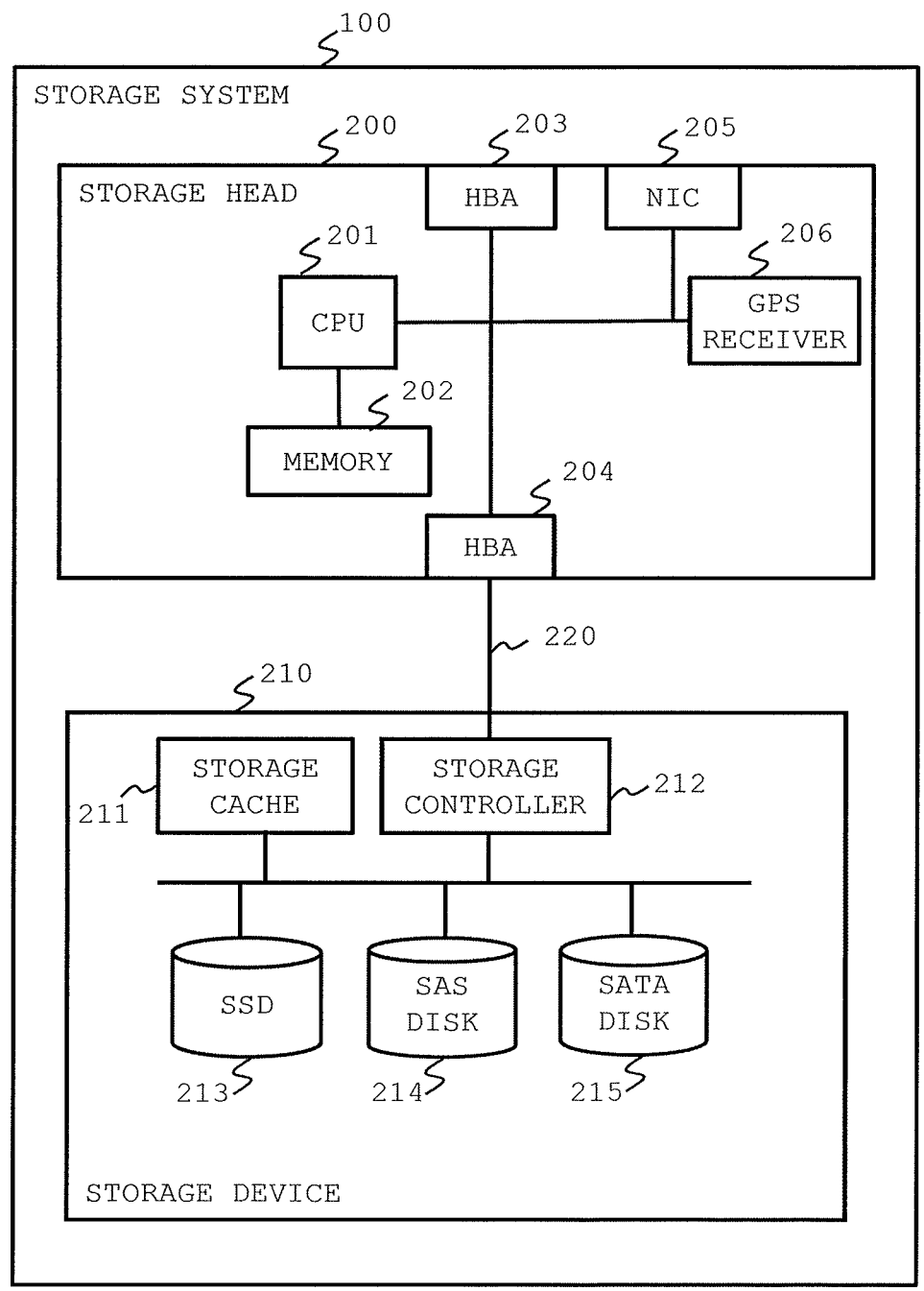
FIG. 4 is a block diagram showing the hardware configuration of a storage system.

FIG. 4 is a block diagram showing the hardware configuration of the storage system 100 of this embodiment. The storage system 100 includes a storage head 200 and a storage device 210. The storage head 200 and the storage device 210 are coupled with each other via a communication channel 220.

The storage head 200 performs management and control of the storage system 100 and the storage device 210. The storage head 200 includes: a memory 202; HBAs (host bus adaptors) 203 and 204; a NIC (network interface card) 205; a GPS (global positioning system) receiver 206; and a CPU 201 that is a control operation unit and connected to the above components.

Another type of memory source can be adopted in place of the memory 202 or can be added to the memory 202. Other types of communication interface device can be adopted in place of the HBAs 203, 204, and the NIC 205. The HBA 203 is coupled with the network 120 of a SAN. The HBA 204 is coupled with the storage device 210 via the communication channel 220. The NIC 205 is coupled with the network 120 such as a LAN, a WAN, or the Internet.

The CPU 201 executes computer programs stored in the memory 202. The memory 202 memorizes the computer programs and other data. In addition, the memory 202 can include a cache region that temporarily memorizes data which is received from the mobile terminals 110 and data which is to be transmitted to the mobile terminals 110. The memory 202 can include a cache region that temporarily memorizes files which are received from the mobile terminals 110 and files which are to be transmitted to the mobile terminals 110.

The GPS receiver 206 is used for obtaining the position information of the storage system 100. The position information obtained by the GPS receiver 206 is used for geographically disposing duplicated data (near or far). To put it concretely, using the latitude/longitude information obtained from the GPS receiver 206, distances between the storage system 100 and other storage systems 100, and distances between the storage system 100 and mobile terminals 110 are calculated, and it is judged whether the duplicated data should be disposed near to or far from the storage systems 100. Furthermore, the position information obtained by the GPS receiver 206 is used for identifying a country where the storage system 100 is installed.

Another type of position information acquisition device can be adopted instead of the GPS receiver 206. For example, it is conceivable that the storage system 100 has a wireless LAN child device built-in, and presumes the position information of itself from the position information of the relevant wireless LAN parent device installed nearby. Alternatively, it is conceivable that the storage system 100 has a transceiver of a mobile phone built-in, and presumes the position information of itself from the position information of an antenna of the relevant mobile phone communication network installed nearby. In another way, it is conceivable that a manager gives position information to the storage head 200 manually without the GPS receiver 206 being used.

The storage device 210 is a memory device for storing programs and files used by the storage head 200. The storage device 210 includes: a storage cache 211; a storage controller 212; an SSD (solid state drive) 213; a SAS (serial attached SCSI) disk 214; and a SATA (serial ATA) disk 215. The above components are coupled with one another via an internal bus or an internal network.

Although FIG. 4 shows that a single storage cache 211, a single storage controller 212, a single SSD 213, a single SAS disk 214, and a single SATA disk 215 are installed in the storage device 210, more than one storage caches 211, more than one storage controllers 212, more than one SSDs 213, more than one SAS disks 214, and more than one SATA disks 215 can be installed. In addition, although FIG. 4 shows a single storage device 210, more than one storage devices 210 can be installed. In the following description, the SSD 213, the SAS disk 214, and the SATA disk 215 are generally named disk devices.

The storage controller 212 communicates with the storage head 200, and controls the storage device 210. To put it concretely, while communicating with the storage head 200, the storage controller 212 writes data into a disk device using an after-mentioned storage cache 211, or reads data from a disk device using the storage cache 211 in accordance with a request sent from the storage head 200.

As described earlier, according to this embodiment, data that is received by the storage controller 212 (write data) or data transmitted by the storage controller 212 (read data) is block data which is specified in a block address format (block data is sometimes referred to as a block for simplicity).

For example, the storage cache 211 is a semiconductor memory, which is used to temporarily store the data to be written into a disk device or block data read from the disk device. Here, a storage device having a lower speed than the semiconductor memory can be used as a portion of the storage cache 211.

The disk device is a device for storing data. In FIG. 4, the storage device 210 includes a single SSD 213, a single SAS disk 214, and a single SATA disk 215, but an arbitrary number of disk devices can be installed in the storage device 210. Here, a typical example of the disk device includes the SSD 213, the SAS disk 214 or the SATA disk 215, but any device can be used as the disk device as long as the device can store block format data, so that a device that includes, for example, a tape archive, an optical disk library such as a DVD and a CD is usable. In the case where a tape archive or an optical disk library is used, although the I/O performance of the storage system may be deteriorated in comparison with the case where an SSD or a HDD is used, the bit cost of the storage system can be reduced.

From the viewpoint of speeding up, redundancy promotion, reliability improvement, and the like, the storage controller 212 can provide plural disk devices as one or more accessible virtual disk devices to the storage head 200 (more concretely, with the use of a RAID technology).

In the following description, the virtual disk device is called a volume, and the description saying, "The storage device or the storage controller writes block data into a volume." actually means that the storage controller 212 writes block data into a storage cache 211 or a disk device.

Similarly, the description saying, "The storage device or the storage controller reads block data from the volume." actually means that the storage controller 212 reads block data from the storage cache 211 or the disk device.

Generally speaking, when the storage controller 212 receives a write request to a volume from the storage head 200, the storage controller 212 notifies the storage head 200 of the completion of writing operation after temporarily writing data into the storage cache 211 having a high access speed.

Then, the storage controller 212 writes data stored in the storage cache 211 into the disk device asynchronously with the write request from the storage head 200 so as to enhance the performance of the storage device 210 as a whole even if the performance of the disk device is low compared with the storage cache 211.

The communication path 220 between the HBA 204 of the storage head 200 and the storage controller 212 of the storage device 210 can be connected via a switch. It is conceivable that there are plural storage heads 200 and plural storage devices 210. A configuration can be adopted in which plural storage heads 200 are coupled with a single storage device 210. A SAN can include plural storage heads 200 and plural storage devices 210.

The communication path 220 between the HBA 204 and the storage device 210 can be comprised of, for example, a fiber channel (FC). Any other type of network (such as an Ethernet (registered trademark)) can be adopted as the communication path 220 as long as it can establish the communication between the HBA 204 and the storage device 210.

Figure 5:
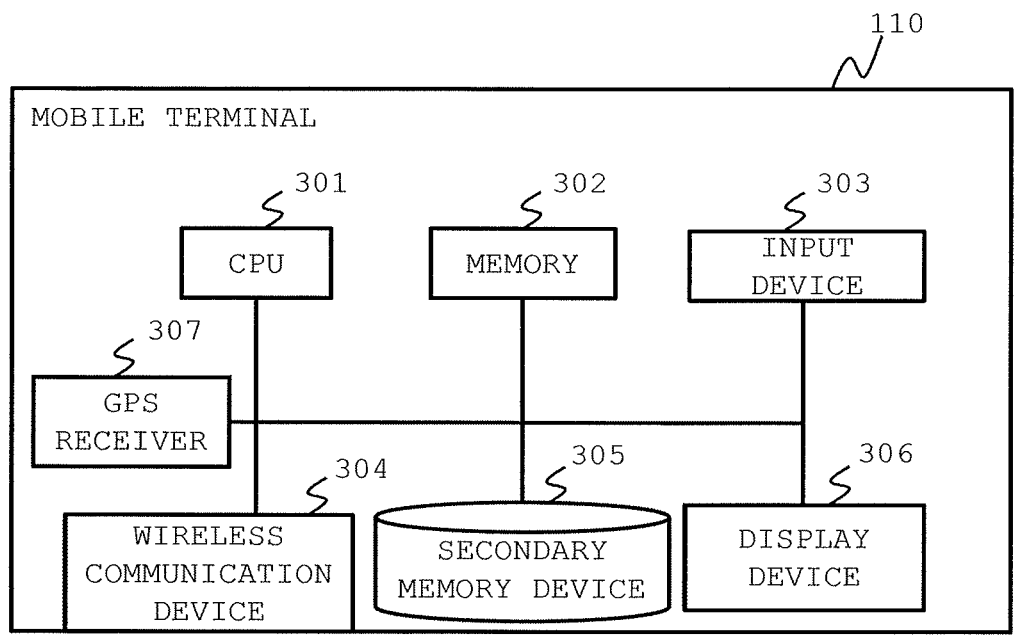
FIG. 5 is a block diagram showing the hardware configuration of a mobile terminal.

FIG. 5 is a block diagram showing the hardware configuration of a mobile terminal 110 of this embodiment. The mobile terminal 110 includes: a memory 302; an input device 303; a wireless communication device 304; a secondary memory device 305; a display device 306; a GPS receiver 307; and a CPU 301 coupled therewith. A different type of memory resource can be adopted in place of at least one of the memory 302 and the secondary memory device 305. Furthermore, the wireless communication device 304 comprises at least one wireless device of a wireless LAN child device, a mobile phone transceiver, a WiMAX (worldwide interoperability for microwave access), and the like. In addition, a wire communication device such as a NIC can be provided in place of the wireless communication device 304.

A computer program is loaded to the memory 302 from the secondary memory device 305. The CPU 301 executes the computer program stored in the memory 302. The input device 303 is a device operated by a user, and it can be, for example, a keyboard or a pointing device. The wireless communication device 304 is coupled with the network 120. The secondary storage device 305 can be, for example, a flash memory, an SSD, or an HDD. The display device 306 can be, for example, a liquid crystal display. The input device 303 and the display device 306 can be integrated into an all-in-one device, for example, as a touch panel.

The GPS receiver 307 is used for obtaining the position information of the mobile terminal 110 as is the case with the GPS receiver 206. The position information obtained by the GPS receiver 307 is used for geographically disposing duplicated data in storage systems that are dispersively located (for judging whether the storage systems are near to or far from the mobile terminal 110).

Another type of position information acquisition device can be adopted in place of or in addition to the GPS receiver 307 as is the case with the GPS receiver 206.

A mobile terminal 110 can access the data communication service of a storage system 100 in accordance with the directions of a user.

Figure 6:
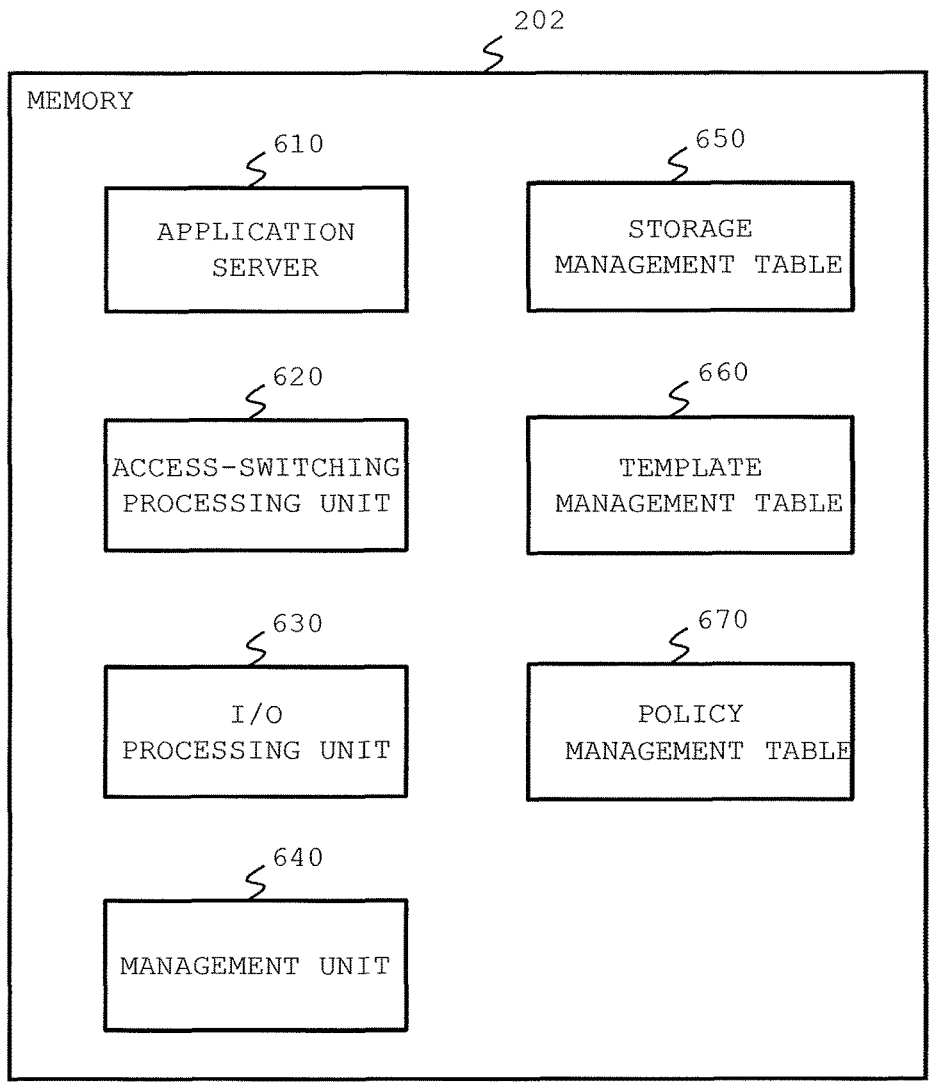
FIG. 6 is a diagram showing the software configuration of a storage head.

FIG. 6 shows the software configuration of the storage head 200 of this embodiment. The software of the storage head 200 includes: an application server 610; an access-switching processing unit 620; an I/O processing unit 630; a management unit 640; a storage management table 650; a template management table 660; and a policy management table 670. These pieces of software are loaded from a storage device 210 to the memory 202, and are executed by the CPU 201.

The application server 610 provides a data communication service to a mobile terminal 110 using communication protocols (NFS/CIFS/FTP/HTTP/REST) and the like. The application server 610 issues an I/O request to data stored in the storage device 210 to the access-switching processing unit 620 in response to a request from the mobile terminal 110. Although a single application server 610 is stored in the memory 202 in this embodiment, plural application servers can also be stored in the memory 202 in the present patent application. For example, it is conceivable that different kinds of application server 610 are stored for the individual communication protocols, or there are some application servers 610 that are the same.

The access-switching processing unit 620 receives the I/O request from the application server 610, and performs I/O processing after determining a consistency control scheme, a storage location for each I/O target data, and a redundancy number on the basis of the information of the I/O target data (for example, a path name) and the policy management table 670. In actuality, the I/O processing is performed by the I/O processing unit 630.

The I/O processing unit 630 performs I/O processing on the data on the basis of requests from the access-switching processing unit 620 and I/O processing units 630 that operate in other storage systems 100. The I/O processing unit 630 is, for example, a file system, a DB (data base), or a KVS (key value store). Although a single I/O processing unit 630 is stored in the memory 202, plural I/O processing units can also be stored in the memory 202 in the present patent application. For example, plural different kinds of I/O processing unit 630 are stored, and these I/O processing units 630 can perform I/O processing on data in conjunction with one another.

The management unit 640 provides a system administrator with a GUI (graphic user interface) and a CLI (command line interface) that manage the relevant storage system 100. When the system administrator updates the storage management table 650, the template management table 660, and the policy management table 670 using the GUI or the CLI, the management unit 660 transmits the update contents of the individual management tables to the individual storage systems 100. Furthermore, the management unit 640 receives the update contents of a storage management table 650, a template management table 660, and a policy management table 670 that occurs in another storage system 100, and reflects the update contents in the storage management table 650, the template management table 660, and the policy management table 670 of its own.

Figure 7:
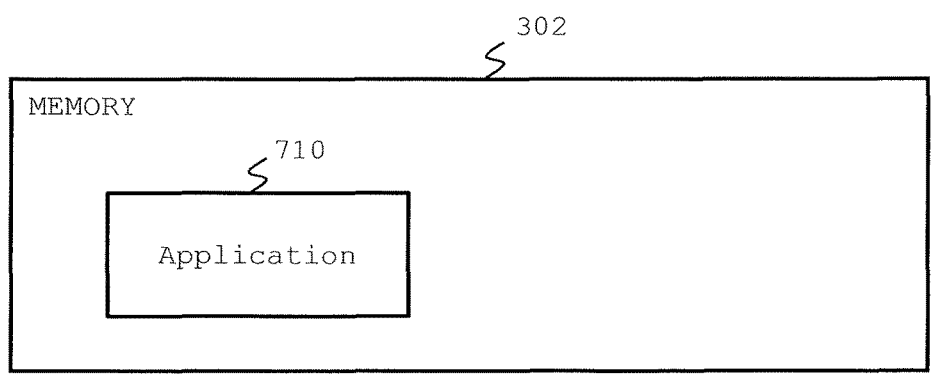
FIG. 7 is a diagram showing the software configuration of the mobile terminal.

FIG. 7 shows the software configuration of a mobile terminal 110 of the present invention. The software of the mobile terminal 110 includes an application 710. The application 710 is loaded from the secondary memory device 305 to the memory 302.

The application 710 performs data communication with the application server 610 of a storage head 200 using a communication protocol (NFS, CIFS, FTP, HTTP, or REST). The application 710 is a dedicated application program compatible with not only the abovementioned SNS application but also a web browser, an NFS client, a CIFS client, an FTP client, a Web DAV client, and the application server 610.

The application 710 can be an application that receives the result that is obtained when the storage system 100 deals with and assembles data which a storage system 100 possesses instead of receiving the data directly. In addition, when performing data communication with the application server 610, the application 710 can transmit data to which the position information obtained from the GPS 307 is attached.

Although a single application 710 is stored in the memory 302 in this embodiment, plural applications can also be stored in the memory 302 in the present patent application. For example, it is conceivable that plural different kinds of application 710 are stored for the individual communication protocols, or several applications 710 that use the same communication protocol are stored.

FIG. 8 shows a configuration example of a storage management table 650 of this embodiment. The rows (821 to 825) of the storage management table 650 correspond to storage systems 100 respectively, and each row includes Storage Name 811, IP Address 812, Position Information 813, and Credibility 814.

Storage Name 811 shows an ID that is given to a storage system 100 and unique in the distributed storage system shown in FIG. 3. IP Address 812 shows an IP address used for performing the control of the storage system 100 and for accessing data. Position Information 813 shows the installation location of the storage system 100, for example, a country. Credibility 814 is an index showing the degree of difficulty for the storage system 100 to be illegally accessed, and the index shows three levels, that is, "High", "Middle", and "Low". Here, "High" shows the highest evaluation that it is the most difficult for the storage system 100 to be illegally accessed.

For example, in the case of a storage system 100 shown by the row 821 of the storage management table 650, information about the storage system shows that Storage Name 811 is ST1, IP Address 812 is 192.168.10.1, Position Information 813 is country A, and Credibility 814 is "High".

Here, although IP address is stored using the IPv4 addressing scheme in this embodiment, an addressing scheme that can be used in the present patent application is not limited to the IPv4 addressing scheme. For example, the IPv6 addressing scheme can be used for storing IP address, or IP address can be stored not only by an IP address scheme but also by a DNS name.

Furthermore, although Position Information 813 records a country name in this embodiment, an item that can be recorded by Position Information 813 is not limited to a country name in the present patent application. For example, not only a country name but also an address can be stored, or GPS information can be recorded in the degree format or in the degree-minute-second format.

In addition, although Credibility 814 is stored as one of the three levels "High", "Middle", and "Low", it can be stored in a different way in the present patent application. For example, Credibility 814 can be represented by a numerical value. Alternatively, it is conceivable that the storage management table 650 does not directly manage Credibility 814, but obtains Credibility 814 by referring to a third party.

Furthermore, although the storage management table 650 stores Storage Name 811, IP Address 812, Position Information 813, and Credibility 814 as information about a storage system 100 in this embodiment, items that the storage management table 650 can store is not limited to the above items in the present patent application. For example, the storage management table 650 can store the presence or absence of a function that each storage system 100 has (an overlapping exclusion function, a version management function, or an I/O interface), fault tolerance, an I/O performance, a free space, a bit cost, and the like. In this case, in the I/O processing of a storage system 100, a storage system in which data is duplicated is selected on the basis of the additional information (regarding the presence or absence of the function, the fault tolerance, the I/O function, the free space, or the bit cost) in addition to or instead of IP Address 812, Position Information 813, and Credibility 814.

FIG. 9 is a configuration example of the template management table 660 of this embodiment. Each of the rows (921 to 926) of the template management table 660 corresponds to each policy template, and includes Template Name 911, Consistency 912, Response 913, and Redundancy Number 914.

Template Name 911 shows an ID that is given to specify a template and unique in the distributed storage system. Consistency 912 shows a policy of consistency control. Consistency 912 is shown by one of three levels, that is, "Strong (strong consistency control)", "Weak (weak consistency control)", and "Unnecessary". Response 913 shows a policy whether response is valued or not. Response 913 is shown by "Valued", or "-(Not Valued)". Redundancy Number 914 shows the duplication number of data (a total number of an original datum and duplicated data, and this is also referred to as a duplicated data number). It is conceivable that Redundancy Number 914 is designated directly by a duplication number, or designated using an inequality sign, that is, "<", ">", "≤", or "≥". For example, Redundancy Number "1<" of the row 925 means that a redundancy number is larger than 1.

A system administrator can switch an access method to data in accordance with the characteristics of the data according to a template by storing a combination of the path of the data and Template Name 911 in a policy management table 670 that will be after-mentioned in FIG. 10.

For example, the row 921 shows that Template Name 911 is T1, Consistency 912 is "Strong", Response 913 is "Valued", and Redundancy Number 914 is "2". As for data that is instructed to use this template, I/O processing to the data is performed under the strong consistency control, the data is disposed in the vicinity of a user's mobile terminal 110 in order to especially value the response of the data, and the redundancy number is set to 2 in preparation for a failure or the like. Among data that is instructed to use the template shown by the row 921, there is management information and the like that need compliance such as accounting information.

As for data that is instructed to use a template shown by the row 924, I/O processing on the data is performed under the weak consistency control, and the redundancy number of the data is set to 3 in preparation for a failure or the like. Among data that is instructed to use the template shown by the row 924, there are, for example, time-series log data that can be afterward merged, comments written in an SNS, messages written in a bulletin board, and the like.

Similarly, as for data that is instructed to use a template shown by the row 925, I/O processing on the data is performed under no control, which means that as many data pieces as you like can be duplicated, and therefore each storage system 100 can retain data as cache data. Data that is instructed to use a template shown by the row 926 is, for example, an image file, such as a file of moving images or a file of pictures.

Here, in this embodiment, Consistency 912 is shown by one of the three levels, that is, "Strong", "Weak", and "Unnecessary", it can be shown in a different way in the present patent application. For example, a consistency control scheme (algorithm) can be directly specified.

In addition, although Response 913 is shown by "Valued" or "Not Valued" in this embodiment, it can be shown in a different way in the present patent application. For example, it can be shown by a numerical value of response time (equal to or less than 1 second, equal to or less than 5 seconds, or the like).

FIG. 10 is a configuration example of a policy management table 670 of this embodiment. Each of the rows (1021 to 1026) of the policy management table 670 corresponds to each access-switching policy, and includes Path 1011, In-Use Template Name 1012, Condition 1013, and In-Use Storage 1014.

Path 1011 shows a path of a directory storing data in the relevant storage system 100. In-Use Template Name 1012 shows Template Name 911 managed by the template management table 660. Condition 1013 shows the conditions of position information and credibility as the storage conditions of the storage system that stores the data. The data is stored in the storage system that satisfies the above conditions. In-Use Storage 1014 shows Storage Names 811 of a storage that currently stores the duplicated data of the data shown by Path 1011.

The policy management table 670 is used for selecting an access scheme specified by a policy shown by the In-Use Template 1012 in accordance with the characteristics of data specified by the Path 1011. For example, an access-switching policy shown by the row 1021 selects an access scheme specified by the policy of T2 shown by In-Use Template 1012 when I/O processing is performed on data stored under /A/profileDB/ shown by Path 1011. Here, it is shown that storages that store the data are disposed in Storage Location (Country A) shown by Condition 1013, they are storage systems 100 with Credibility "High", and the storages that currently store the data are ST1 and ST2 shown by In-Use Storage 1014.

Furthermore, although Path 1011 is specified by the directory in this embodiment, it can be specified in a different way in the present patent application. For example, Path 1011 can be managed by the file that is a lower tier than the directory, or can be managed by the chunk that is a further lower tier than the file wherein chunks are obtained by dividing a file into striping file chunks and being saved. Conversely, Path 1011 can be managed by the file system or by the volume that are higher tiers than the directory.

In addition, although Condition 1013 specifies Storage Location (for example, a country) and Credibility in this embodiment, it can specify other items in the present patent application. For example, the presence or absence of a function, the fault tolerance, the I/O function, the free space, the bit cost, and the like of the storage system 100 can be set as conditions.

Figure 11:
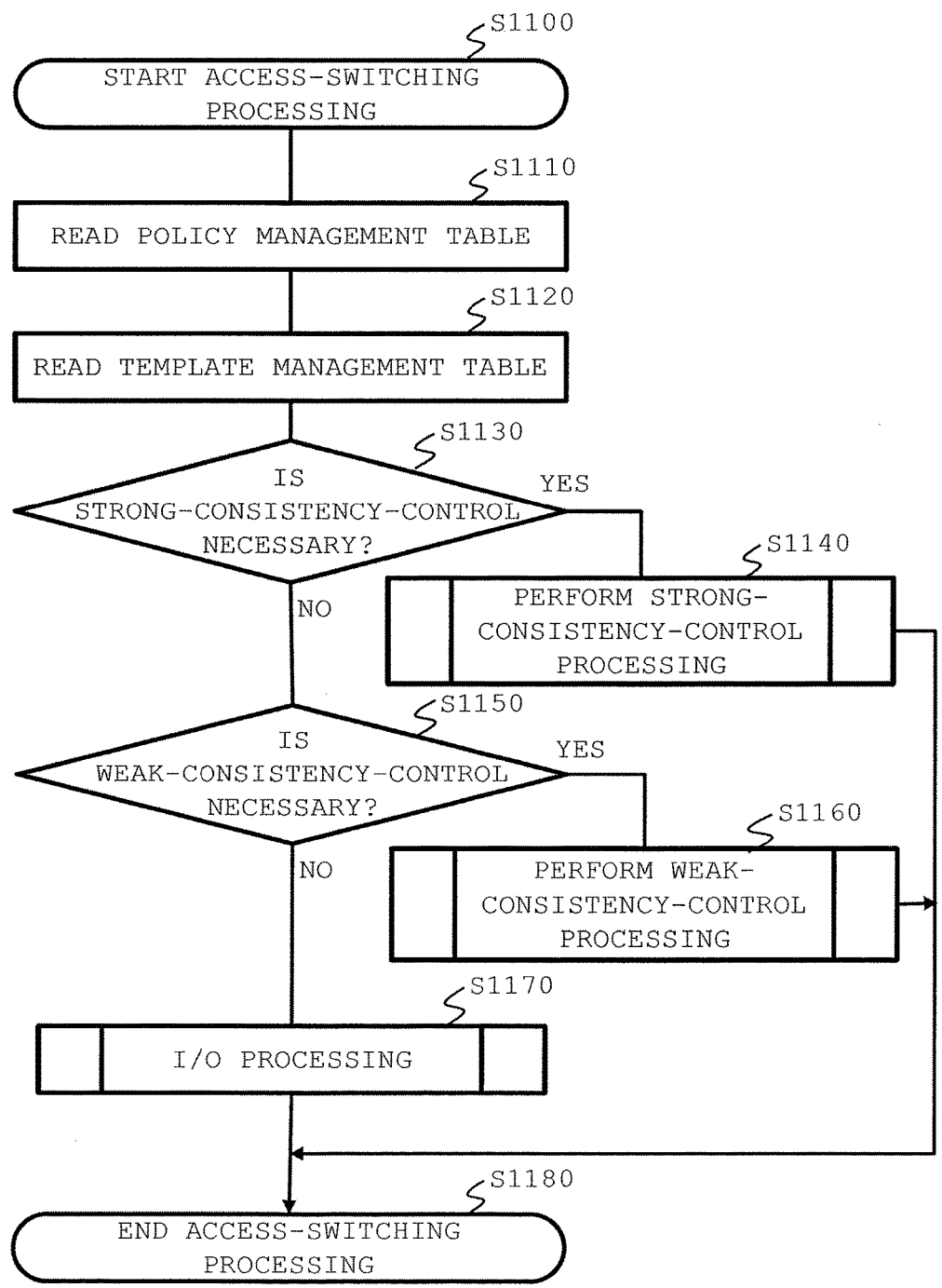
FIG. 11 is the flowchart of an access-switching processing unit.

FIG. 11 is the flowchart of the access-switching processing unit 620 of this embodiment. After receiving an I/O request from the application server 610, the access-switching processing unit 620 starts processing (at S1100).

The access-switching processing unit 620 reads the policy management table 670 (at S1110). Successively the access-switching processing unit 620 reads the template management table 660 (at S1120). The access-switching processing unit 620 extracts the path name of an I/O target file from the I/O request, and checks the path name with Path 1011 of each row (each access-switching policy) of the policy management table 670. When Path 1011 identical to the path to the I/O target file is found, the access-switching processing unit 620 extracts In-Use Template Name 1012 in the same row. The access-switching processing unit 620 checks the extracted In-Use template Name 1012 with Template Name 911 in each row (policy template) of the template management table 660. When Template Name 911 identical to the extracted In-Use template Name 1012 is found, the access-switching processing unit 620 extracts Consistency 912 in the same row, and judges whether the I/O requires the strong consistency control or not (at S1130).

Figure 12:
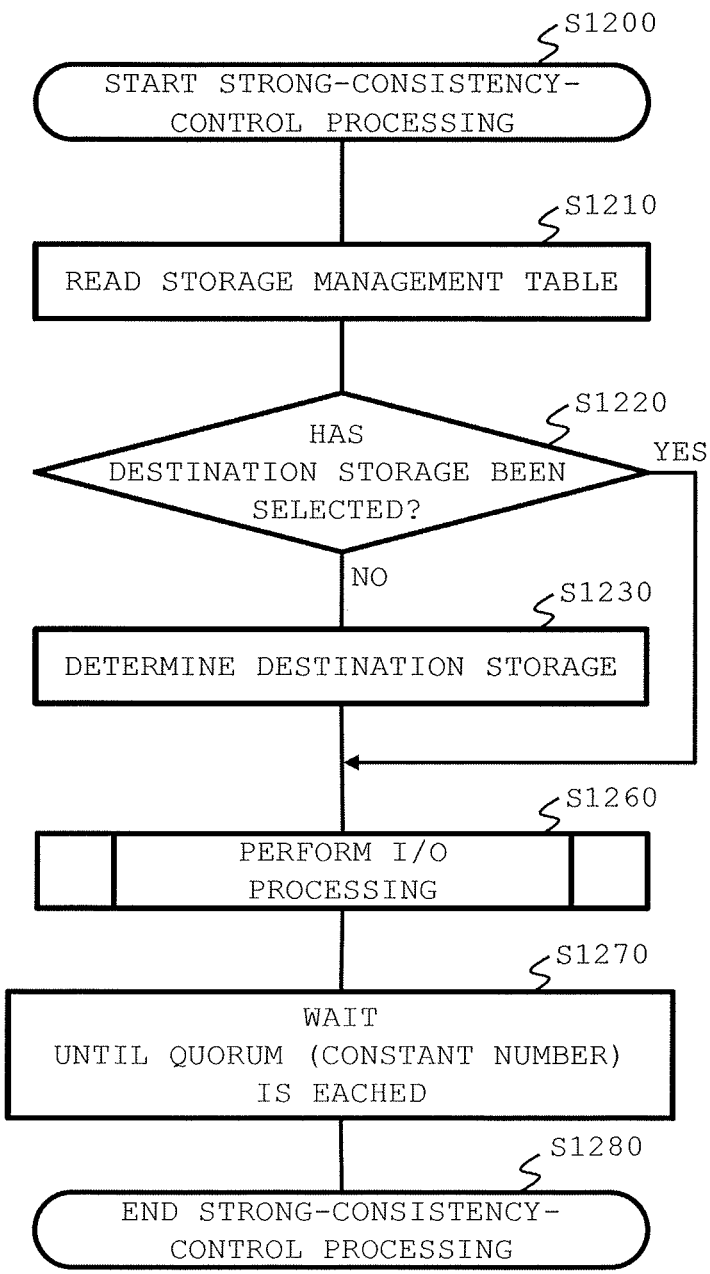
FIG. 12 is the flowchart of a strong-consistency-control processing unit.

If the strong consistency control is necessary (YES at S1130), the access-switching processing unit 620 calls up a strong-consistency-control processing unit shown in FIG. 12 (at S1140).

If the strong consistency control is not necessary (NO at S1130), the access-switching processing unit 620 extracts Consistency 912, and judges whether the I/O requires the weak consistency control or not (at S1150).

Figure 13:
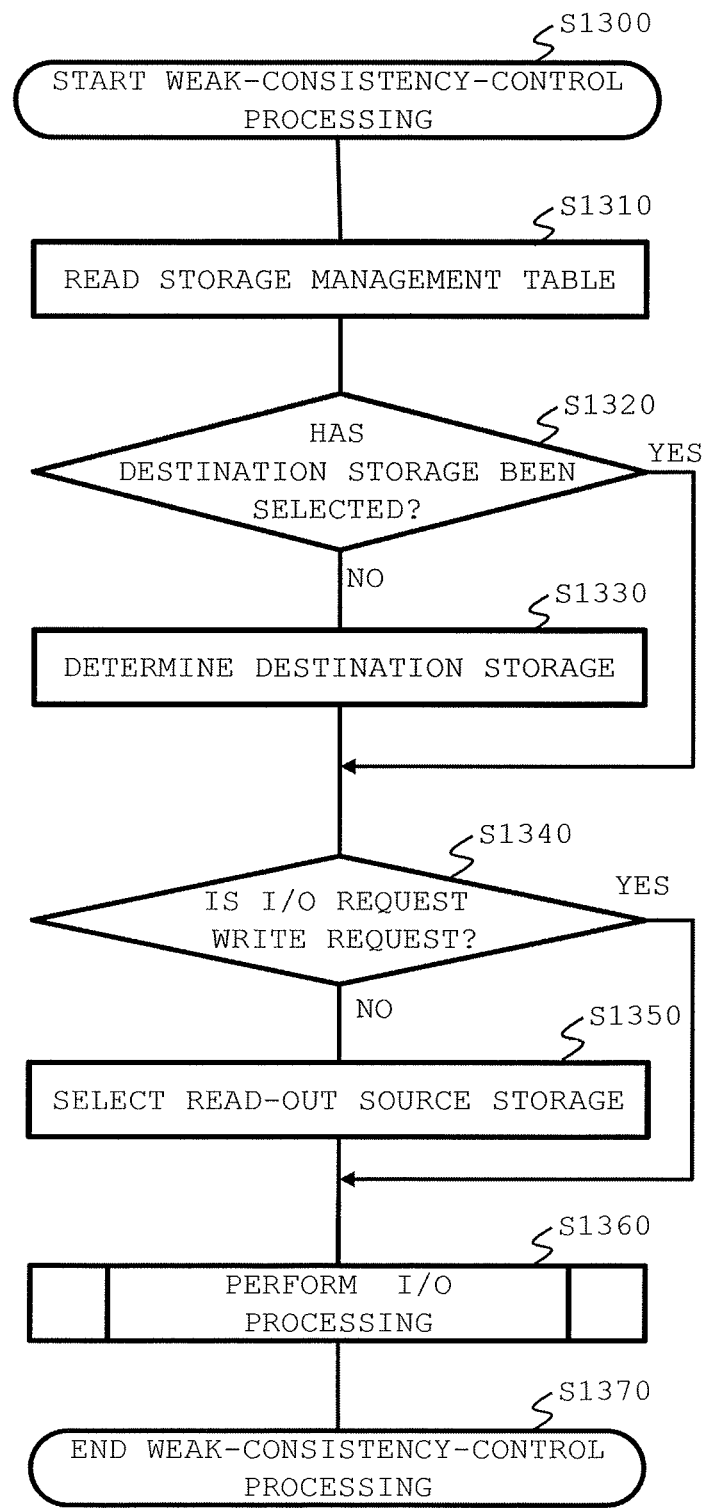
FIG. 13 is the flowchart of a weak-consistency-control processing unit.

If the weak consistency control is necessary (YES at S1150), the access-switching processing unit 620 calls up a weak-consistency-control processing unit shown in FIG. 13 (at S1160).

Figure 14:
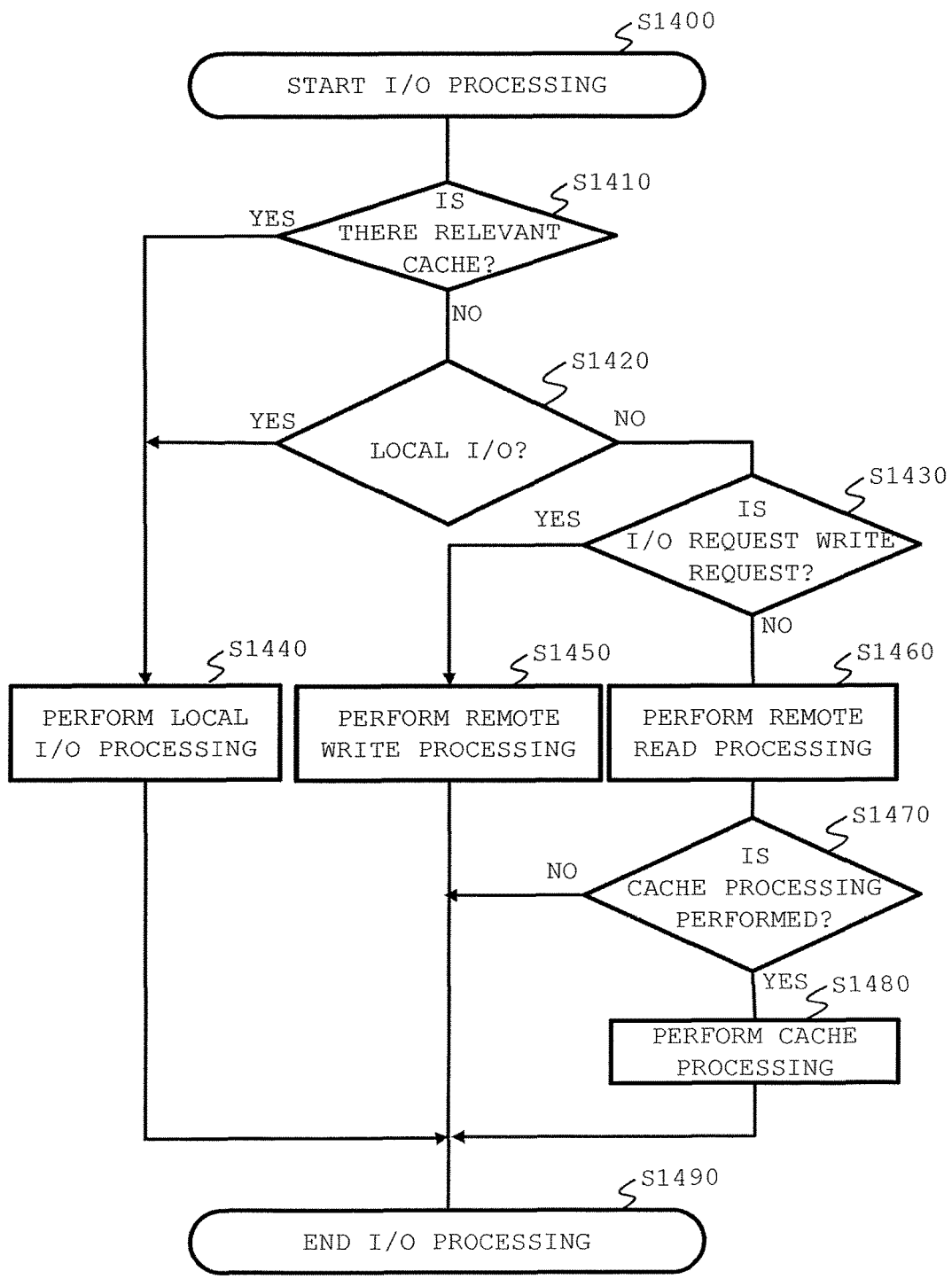
FIG. 14 is the flowchart of an I/O processing unit.

If the weak consistency control is not necessary (NO at S1150), the access-switching processing unit 620 calls up the I/O processing unit 630 shown in FIG. 14 (at S1170).

After finishing any one of the strong-consistency-control processing unit at S1140, the weak-consistency-control unit at S1160, and I/O processing unit 630 at S1170, the access-switching processing unit 620 finishes its processing (at S1180).

FIG. 12 is the flowchart of the strong-consistency-control processing unit of this embodiment. The strong-consistency-control processing unit along with the I/O request, an access-switching policy and a policy template that correspond to the I/O request is called up by the access-switching processing unit 620 (at S1200).

The strong-consistency-control processing unit reads the relevant storage management table 650 (at S1210). The strong-consistency-control processing unit judges whether a storage system name or storage system names are stored in In-Use Storage 1014 of the access-switching policy or not (at S1220).

If no storage system name is stored (NO at S1220), the strong-consistency-control processing unit determines a storage system 100 for storing data on the basis of the access-switching policy, the policy template, and the storage management table. First, plural storage systems 100 whose Storage Location and Credibility are respectively the same as Storage Location (the name of a country or the like) and Credibility of Condition 1013 of the access-switching policy are extracted from the storage management table 650 as the candidates of storages for storing data. Next, the number of storage systems 100 that duplicate the I/O target data is determined so that the number is equal to the numerical value of Redundancy Number 914 of the policy template corresponding to the I/O target data. Storage systems 100, the number of which is equal to a larger one of READ constant and WRITE constant of quorum among Redundancy Number 914 and that are located near on the network or geographically, are selected as storage systems for storing the duplicated I/O target data. If the number of the selected storage systems 100 is smaller than Redundancy Number 914, storage systems 100 that are located far away on the network or geographically are selected as the remaining number of storage systems for storing the duplicated data. In addition, in this case, if Response 913 is "Valued", storage systems 100 are selected in consideration of not only distances on the network or geographic distances among storage systems 100 but also distances on the network or geographic distances among storage systems 100 and mobile terminals 110 (in order for storage systems to have better response).

Here, as an example of a method for detecting a distance between a mobile terminal 110 and a storage system 100 or a distance between two storage systems, there is a method in which ECHO_REQUEST of ICMP is transmitted by the mobile terminal 110 or one of the two storage systems 100 to the counterpart storage system 100, and a time period from the time when ECHO_REQUEST of ICMP is transmitted to the time when the relevant packet is returned is measured. Alternatively, there is a method in which the distance is estimated using Position Information 813, or a method in which the distance is estimated on the basis of a geographic distance obtained by using geographic position information received by the relevant GPS receiver 206.

The strong-consistency-control processing unit stores the names of the determined storage systems 100 for storing the duplicated data in In-Use Storage 1014 of the access-switching policy (at S1230). Here, the policy management table 670 updated by the process at S1230 is notified to each storage system 100 by the relevant management unit 640. The management unit 640 of each storage system 100 updates the policy management table 670 of its own.

If a storage system name or storage system names are stored (YES at S1220), or if a storage or storages for storing the duplicated data are assigned at S1230, the strong-consistency-control processing unit calls up the I/O processing unit 630 along with the I/O request and In-Use Storage 1014 of the access-switching policy (at S1260).

The strong-consistency-control processing unit waits until the number of storage systems that have finished I/O processing of WRITE or READ reaches quorum (constant) (at S1270). After checking that quorum is reached at S1280, the strong-consistency-control processing unit ends the strong-consistency-control processing (at S1280).

This strong-consistency-control processing can make access latency small by disposing storage systems 100, which store the duplicated data and the number of which is equal to quorum (constant), in the vicinity.

Although a way in which quorum is used has been adopted so far in the strong-consistency-control scheme in this embodiment, other ways can be adopted in the present patent application. For example, there can be a way in which storage systems 100 in the vicinity are selected as storage systems for storing duplicated data and READ/WRITE is performed in synchronization with all the destination storage systems 100 for storing the duplicated data, or there can be a way in which READ/WRITE is performed in synchronization with more than a predefined number of storage systems 100 in the vicinity and READ/WRITE is performed in asynchronization with the remaining number of faraway storage systems.

FIG. 13 is the flowchart of the weak-consistency-control processing unit of this embodiment. The weak-consistency-control processing unit along with the I/O request, an access-switching policy and a policy template that correspond to the I/O request is called up by the access-switching processing unit 620 (at S1300).

The weak-consistency-control processing unit reads the relevant storage management table 650 (at S1310). The weak-consistency-control processing unit judges whether a storage system name or storage system names are stored in In-Use Storage 1014 of the access-switching policy or not (at S1320).

If no storage system name is stored (NO at S1320), the weak-consistency-control processing unit determines a storage system 100 for storing data on the basis of the access-switching policy, the policy template, and the storage management table. First, plural storage systems 100 whose Storage Location and Credibility are respectively the same as Storage Location (the name of a country or the like) and Credibility of Condition 1013 of the access-switching policy are extracted from the storage management table 650 as the candidates of storages for storing data. Next, the number of storage systems 100 that duplicate the I/O target data is determined in accordance with the numerical value of Redundancy Number 914 of the policy template corresponding to the I/O target data. Storage systems 100 for duplicating I/O target data are selected in such a way that the sum of the number of storage systems 100 that are in the vicinity on the network or geographically and the number of faraway storage systems 100 becomes equal to Redundancy Number 914. The reason why the data is duplicated in the faraway storage systems 100 is that the duplicated data in the faraway storage systems 100 are needed in preparation for a disaster such as an earthquake. In addition, in this case, if Response 913 is "Valued", storage systems 100 are selected in consideration of not only distances on the network or geographic distances among storage systems 100 but also distances on the network or geographic distances among storage systems 100 and mobile terminals 110 (in order for storage systems to have better response).

The weak-consistency-control processing unit stores the names of the determined storage systems 100 for storing the duplicated data in In-Use Storage 1014 of the access-switching policy (at S1330). Here, the policy management table 670 updated by the process at S1330 is notified to each storage system 100 by the relevant management unit 640. The management unit 640 of each storage system 100 updates the policy management table 670 of its own.

If a storage system name or storage system names are stored (YES at S1320), or if a storage or storages for storing the duplicated data are selected at S1330, the weak-consistency-control processing unit judges whether the I/O request is WRITE request or not (at S1340).

If the I/O request is not WRITE request (NO at S1340), the weak-consistency-control processing unit selects a storage system 100, to which READ request is sent, from In-Use Storage 1014 of an access-switching policy. If the data is stored in the storage system 100 that is executing the weak-consistency-control processing unit (local storage system 100), the local storage system 100 is selected. If the data is not stored in the local storage system 100, a storage system 100 that is the nearest on the network or geographically among storage systems that store the data is selected by referring to the storage management table 650 and In-Use Storage 1014 (at S1350).

In the case of WRITE request (YES at S1340), or in the case where the read-out source storage is selected at S1350, the weak-consistency-control processing unit calls up I/O Processing Unit 630 along with the I/O request and the name of the read-out source storage in the case of READ request, and the weak-consistency-control processing unit calls up I/O Processing Unit 630 along with the I/O request and the names of storage systems 100 stored In-Use Storage 1014 of an access-switching policy in the case of Write request.

The weak-consistency-control processing unit ends the weak-consistency-control processing when the notification that the I/O processing at S1360 is finished is returned from at least one storage system 100 (at S1370).

This weak-consistency-control processing can make access latency small by selecting storage systems 100 which are located near on the network or geographically as part of storage systems 100 for storing the duplicated data.

FIG. 14 is the flowchart of the I/O processing unit 630 of this embodiment. The I/O processing unit 630 along with an I/O request and the name of a storage system 100 to which this I/O request is to be sent is called up by the access-switching processing unit 620, the strong-consistency-control processing unit, the weak-consistency-control processing unit, and I/O processing units 630 executed by other storage systems 100 (at S1400).

The I/O processing unit 630 judges whether or not there is a cache of an I/O request target file in the local storage system 100 (at S1410). If there is the cache (YES at S1410), the I/O processing unit 630 performs the I/O processing on the local storage system 100 (at S1440).

If there is no cache of the I/O request target file (NO at S1410), the I/O processing unit 630 judges whether or not the storage system 100 to which the I/O request is to be sent is the local storage system 100 (at S1420).

If the storage system 100 to which the I/O request is to be sent is the local storage system 100 (YES at S1420), the I/O processing unit 630 performs the I/O processing on the local storage system 100 (at S1440).

If the storage system 100 to which the I/O request is to be sent is not the local storage system 100 (NO at S1420), the I/O processing unit 630 judges whether the I/O request is WRITE request or not (at S1430).

If the I/O request is WRITE request (YES at S1430), the I/O processing unit 630 issues WRITE request to remote storage systems 100 (at S1450).

If the I/O request is not WRITE request but READ request (NO at S1430), the I/O processing unit 630 issues READ request to the remote storage systems 100 (at S1460).

When the processing about READ request at S1460 is finished, the I/O processing unit 630 judges whether the result of the READ processing should be cached or not on the basis of the relevant access template and policy template (at S1470). For example, if Consistency 912 and Redundancy 914 of the I/O target data is "Unnecessary" and "1<" respectively, because the I/O processing can be performed on the respective storage systems 100 without executing consistency processing, the respective storage systems 100 have caches for improving the efficiency of the I/O processing.

If the result of the READ processing is cached (YES at S1470), the I/O processing unit 630 performs cache processing (at S1480). If the result of the READ processing is not cached (NO at S1470), the cache processing at S1480 is finished, or the local I/O processing at S1440 is finished, the I/O processing unit 630 ends the I/O processing (at S1490).

Here, if plural storage systems 100 to which the I/O request is to be sent are designated at the start of the I/O processing unit 630, the processing from S1420 to S1480 is repeated in accordance with the number of the storage systems 100.

FIG. 15 shows an example of a GUI (graphical user interface) which manages the policy settings of this embodiment. The management unit 640 of each storage system 100 provides a GUI 1500 for policy settings to a system administrator via the input/output device (not shown) of the storage system 100. The system administrator provides directions for policy settings to the storage system 100 using the GUI 1500.

The GUI 1500 includes a policy setting list unit 1510, a policy setting input unit 1520, Add button 1530, Delete button 1540, Update button 1550, and End button 1560.

The policy setting list unit 1510 is a region for displaying information of a policy management table 670 stored in each storage system 100, and includes Path 811, In-Use Template Name 812, Condition 813; and In-Use Storage 814. The meanings of items of Path 811 to In-Use Storage 814 are the same as those of the policy management table 670 respectively.

The policy setting input unit 1520 includes the input field 1521 of Path 811, the input field 1522 of In-Use Template 812, the input field 1523 of Storage Location (the name of a country) of Condition 813, the input field 1524 of Credibility of Condition 813, and the input field 1525 of In-Use Storage 814.

When the administrator pushes Add button 1530, the management unit 640 adds individual values, which are input to the policy setting input unit 1520, to the policy management table 670 as new policy settings. When the administrator pushes Delete button 1540, the management unit 640 deletes the settings of a row designated by Radio button 1511 from the policy management table 670. When the administrator pushes Update button 1550, the management unit 640 updates the settings of a row designated by Radio button 1511, and these settings are stored in the policy management table 670. When the administrator pushes End button 1560, the management unit 640 ends the policy setting, and closes the GUI 1500.

After the policy management table 670 is updated using Add button 1530, Delete button 1540, or Update button 1550, the update contents are notified to all the storage systems 100 of the distributed storage system, and the management unit 640 of each storage system 100, which receives the update contents, updates the relevant policy management table 670.

In this embodiment, although In-Use Storage 814 is designated in the input field 1525, this designation is an initial setting of a storage system 100 that is used for storing data. The storage system 100 that is used for storing data momentarily varies in accordance with the status of the distributed storage system. For example, if a failure occurs in a storage system 100 that is used for storing data, an alternative storage system 100 is configured to store the data.

Furthermore, although the initial setting of In-Use Storage 814 is designated using the input field 1525 in this embodiment, there is a different way in the present patent application. For example, it is conceivable that a storage system 100 selects a storage system 100 for storing data on the basis of its own policy without needing the initial setting.

Although the above embodiment of the present invention has been described so far, this embodiment is merely an exemplification for explaining the present invention, and is not intended to limit the scope of the present invention to the above-described configuration. The present invention can be materialized in many other embodiments.

LIST OF REFERENCE SIGNS

100: Storage System, 110: Mobile Terminal, 120: Network, 200: Storage Head, 210: Storage Device, 610: Application Server, 620: Access-Switching Processing Unit, 630: I/O Processing Unit, 640: Management Unit, 650: Storage Management Table, 660: Template Management Table, 670: Policy Management Table

The invention claimed is:

1. A distributed storage system including a plurality of storage systems coupled with one another via a network, a first storage system among the plurality of storage systems comprising:
    a strong-consistency-control processing unit which, during access to duplicated data stored in the distributed storage system, controls data synchronization that ensures the consistency of the duplicated data that the accessed duplicated data is the latest;
    a weak-consistency-control processing unit which, during access to the duplicated data, controls data synchronization that does not necessarily ensure the consistency of the duplicated data;
    an access-switching processing unit which:
        in response to an I/O request for the duplicated data, determines, in accordance with policies predetermined in accordance with characteristics of the duplicated data, a redundancy number corresponding to the number of second storage systems to have the duplicated data stored thereon;
        selects, from among the plurality of storage systems, in accordance with the characteristics of the duplicated data and a position of a terminal issuing the I/O request, second storage systems of a number corresponding to the redundancy number; and
        selectively determines via an access-switching policy and a policy template that correspond to the I/O request, as the control for the data synchronization, one from among a strong-consistency-control scheme, a weak-consistency-control scheme, and an unnecessary consistency control scheme, wherein the policy templates include information regarding the consistency used for determining the control for the data synchronization, the access response, and the redundancy number;
        wherein the unnecessary consistency control scheme, consistency and redundancy of the I/O target data is unnecessary, because the I/O processing can be performed on the respective storage systems without executing consistency processing; and
    an I/O processing unit which executes, on the basis of the determined control for the data synchronization, the I/O request for the duplicated data in the selected second storage systems.

2. The distributed storage system according to claim 1, wherein the second storage systems, which are selected in accordance with the redundancy number, include storage systems in the vicinity of the position of the terminal.

3. The distributed storage system according to claim 2, wherein each of the second storage systems is selected on the basis of at least one of its geographic distance or its distance on the network from the first storage system while its access response is taken into reflection.

4. The distributed storage system according to claim 3, wherein the strong-consistency-control processing unit uses quorum for checking whether a majority of the duplicated data, which are to be stored in the first storage system and the second storage systems, has already been written or not in order to ensure the consistency of the duplicated data.

5. The distributed storage system according to claim 4, wherein the first storage system is one of the second storage systems.

6. The distributed storage system according to claim 5, wherein the characteristics of the duplicated data are judged on the basis of the path name of a directory which stores the duplicated data included in the I/O request.

7. The distributed storage system according to claim 6, wherein the policies include conditions regarding the positions and credibilities of the second storage systems which store the duplicated data, and policy templates to be used, and
    the policy templates include information regarding the consistency used for determining the control for the data synchronization, the access response, and the redundancy number.

8. A data access method in a distributed storage system including a plurality of storage systems coupled with one another via a network,
    wherein a first storage system among the plurality of storage systems performs the steps of:
    determining, in response to an I/O request for the duplicated data and in accordance with policies predetermined in accordance with characteristics of the duplicated data, a redundancy number corresponding to a number of second storage systems to have the duplicated data stored thereon;
    selecting, from among the plurality of storage systems, in accordance with the characteristics of the duplicated data and a position of a terminal issuing the I/O request, second storage systems of a number corresponding to the redundancy number;
    selectively determining via an access-switching policy and a policy template that correspond to the I/O request, as the control for the data synchronization, one from among (1) strong consistency control scheme which, during access to the duplicated data stored in the distributed storage system, controls data synchronization that ensures the consistency of the duplicated data that the accessed duplicated data is the latest, (2) weak consistency control scheme which, during access to the duplicated data, controls data synchronization that does not necessarily ensure the consistency of the duplicated data, and (3) an unnecessary consistency control scheme, wherein the policy templates include information regarding the consistency used for determining the control for the data synchronization, the access response, and the redundancy number;
    wherein the unnecessary consistency control scheme, consistency and redundancy of the I/O target data is unnecessary, because the I/O processing can be performed on the respective storage systems without executing consistency processing; and
    executing, on the basis of the determined control for the data synchronization, the I/O request for the duplicated data in the selected second storage systems.

9. The data access method according to claim 8, wherein the second storage systems, which are selected in accordance with the redundancy number, include storage systems in the vicinity of the position of the terminal.

10. The data access method according to claim 9,
wherein each of the second storage systems is selected on the basis of at least one of its geographic distance or its distance on the network from the first storage system while its access response is taken into reflection.

11. The data access method according to claim 10,
wherein the strong consistency control uses quorum for checking whether a majority of the duplicated data, which is to be stored in the first storage system and the second storage systems, has already been written or not in order to ensure the consistency of the duplicated data.

12. The data access method according to claim 11,
wherein the first storage system is one of the second storage systems.

13. The data access method according to claim 12,
wherein the characteristics of the duplicated data are judged on the basis of the path name of a directory which stores the duplicated data included in the I/O request.

14. The data access method according to claim 13,
wherein the policies include conditions regarding the positions and credibilities of the second storage systems which store the duplicated data, and policy templates to be used, and the policy templates include information regarding the consistency used for determining the control for the data synchronization, the access response, and the redundancy number.

* * * * *